United States Patent [19]

Takagi et al.

[11] Patent Number: 4,673,612

[45] Date of Patent: Jun. 16, 1987

[54] MAGNETIC RECORDING MEDIUM

[75] Inventors: Hiroshi Takagi; Akira Shinmi; Kenji Suzuki, all of Yokohama, Japan

[73] Assignee: Canon Kabushiki Kaisha, Tokyo, Japan

[21] Appl. No.: 813,853

[22] Filed: Dec. 27, 1985

[30] Foreign Application Priority Data

Dec. 28, 1984 [JP] Japan .................................. 59-276496

[51] Int. Cl.$^4$ .............................................. G11B 5/704
[52] U.S. Cl. .................................... 428/216; 427/128; 427/131; 427/132; 428/336; 428/473.5; 428/694; 428/900; 428/611; 428/928
[58] Field of Search ...................... 428/694, 480, 473.5, 428/900, 336, 216, 695, 474.4, 928, 611; 427/128, 131, 132; 360/134–136

[56] References Cited

U.S. PATENT DOCUMENTS

| | | | |
|---|---|---|---|
| 4,470,944 | 9/1984 | Asakura | 428/473.3 |
| 4,539,264 | 9/1985 | Yazawa | 428/694 |
| 4,548,864 | 10/1985 | Nakayama | 428/694 |
| 4,565,234 | 1/1986 | Arai | 428/694 |
| 4,579,778 | 4/1986 | Yamaguchi | 428/694 |
| 4,588,636 | 5/1986 | Shirahata | 428/694 |
| 4,592,942 | 6/1986 | Nishimatsu | 428/694 |

*Primary Examiner*—Ellis P. Robinson
*Attorney, Agent, or Firm*—Fitzpatrick, Cella, Harper & Scinto

[57] ABSTRACT

A magnetic recording medium, comprising an aromatic polyimide film and a magnetic layer of a ferromagnetic material provided on the aromatic polyimide film. The aromatic polyimide film is prepared by imidation of a film formed from a solution of a polyamic acid solution obtained by copolymerization of an aromatic amine component comprising at least 30 mole % of p-phenylene diamine and 0 to 70 mole % of diaminodiphenylether, respectively based on the total amount of the aromatic amine component, and a tetracarboxylic acid dianhydride.

15 Claims, No Drawings

MAGNETIC RECORDING MEDIUM

FIELD OF THE INVENTION AND RELATED ART

This invention relates to a magnetic recording medium having a magnetic layer provided on a base film.

Heretofore, sheets having thin metal films formed on base film surfaces have been used in various fields of the art. For example, in the field of magnetic recording, a magnetic layer of a ferromagnetic material is formed on the surface of a polymeric film and used as a magnetic recording medium (e.g., floppy disc, magnetic recording tape, etc.).

In the field of magnetic recording, as the density of recording is made higher, research is progressing from conventional magnetic recording media of the oxide coating type to magnetic recording media of the metal coating type or the vapor deposition type.

Further, magnetic recording media of the vertical magnetic recording system, capable of surpassing the limit of conventional interplanar magnetic recording system, have also been developed. Also, marked changes are noted in the methods for preparation of magnetic recording media. For example, in place of the conventional method in which a mixture of metal powder having magnetizability (magnetic powder) with a binder is applied by coating, a new thin film deposition method such as the vacuum evaporation method, the sputtering method or the ion plating method as used in formation of an alloy such as Co-Ni, Co-Cr, etc., is going to be used.

In these thin film deposition methods, during film formation of a magnetic layer on a base film, the base film is exposed to a considerably high temperature due to emission of radiation heat from a vaporization source or kinetic energy of vapor deposited particles. Also, since the film such as Co-Cr film is required to have a sufficiently large coercivity, the temperature of the base film may sometimes be raised up to 100° C. or higher, particularly 160° C. or higher, during formation of a magnetic layer. Thus, in the thin film deposition method, in the case of forming a thin metal film on a base film, the base film is required to have a considerable heat resistance.

For the base films of the magnetic recording media of the prior art, polyester films such as those of polyethylene terephthalate have been frequently used. Polyester films have low heat-durable temperatures and therefore, during formation of magnetic layers according to the vaporization method, it was necessary to lower the cooling can temperature to a point below the freezing point and also to keep the base film in sufficiently close contact with the can, thereby permitting the heat to be well dissipated. In the case of polyethylene terephthalate films, however, they were still subjected partially to thermal damage or generation of oligomers which are thermally decomposed products, thereby forming small projections on the surface. Also, polyethylene terephthalate films cannot be used for formation of a magnetic layer which is subjected to a temperature exceeding 160° C., even momentarily.

On the other hand, as heat resistant films, polyimide films and polyamide films have been known in the art. Polyimide films have very high heat resistance among polymeric materials, and they can be used continuously at 250° C. Polyimide films of the prior art are films formed from polymers of pyromellitic acid dianhydride (hereinafter abbreviated as "PMDA") and diaminodiphenyl ether (hereinafter abbreviated as "DADE"), polymers of biphenyltetracarboxylic acid dianhydride (hereinafter abbreviated as "BPDA") and DADE, or polymers of BPDA and p-phenylenediamine (hereinafter abbreviated as "PPD"). These three kinds of polyimide films have not been satisfactory in heat resistance or mechanical properties, with the thermal expansion coefficient ($\alpha$) being too high as about $3.0 \times 10^{-5}$ cm/cm/°C. (20°–250° C.) or too low as $0.4 \times 10^{-5}$ cm/cm/°C. For this reason, an extensive curl has been formed in the magnetic recording medium in which a thin film of an alloy is formed by the vapor deposition method or the sputtering method on the surface of a polyimide film or a polyamide film of the prior art, thus posing a problem in practical application.

As the causes conceivable for the curl as mentioned above, there may be included (a) a stress in the magnetic layer, (b) a difference in thermal expansion coefficient between the base film layer and the magnetic layer, and a thermal stress generated through heat shrinkage of the base film layer, and (c) a mechanical stress applied on the base film during formation of the magnetic layer. Particularly, in a magnetic recording medium which requires a considerably high temperature of the base film during formation of the magnetic layer as demanded for the magnetic characteristics as in a Co-Cr type film forming a vertical magnetic recording medium, the difference in thermal expansion between the base film and the magnetic layer can be a great cause for generation of curl. However, to date, no effective means for removing curl has been found.

Also, the tensil modulus (E) of a base film which is related to rigidity of the resultant magnetic recording medium is about 300 kg/mm² for the conventional polyimide film, about 1000 to 1200 kg/mm² for the conventional polyamide film, thus being too soft or too rigid as compared with polyethylene terephthalate film and having no appropriate tensile strength. For this reason, magnetic recording xedia of the prior art have been poor in running or feeding performance and also subject to occurrence of winding irregularity and further to poor head touch.

SUMMARY OF THE INVENTION

The present invention has been accomplished in view of the drawbacks of the prior art as described above, and an object thereof is to provide a magnetic recording medium which is free from generation of curl and good in running performance and head touch.

More specifically, the magnetic recording medium of the present invention comprises an aromatic polyimide film prepared by imidation of a film formed from a solution of an aromatic polyamic acid which has been obtained by copolymerization of an aromatic diamine component comprising at least 30 mole % of p-phenylenediamine and 0–70 mole % of diaminodiphenylether and a tetracarboxylic acid component comprising biphenyltetracarboxylic acid dianhydride and pyromellitic acid dianhydride, and a magnetic layer of a ferromagnetic material provided on the aromatic polyimide film.

These and other objects, features and advantages of the present invention will become more apparent upon a consideration of the following description of the preferred embodiments of the present invention.

DETAILED DESCRIPTION OF THE INVENTION

The base film to be used in the magnetic recording medium of the present invention is an aromatic polyimide film obtained by film formation and imidation thereof. The film before imidation is prepared from a solution of an aromatic polyamic acid obtained by copolymerization by use of p-phenylenediamine (PPD) alone or both PPD and diaminodiphenyl ether (DADE) as the diamine component, and also by use of both biphenyltetracarboxylic acid dianhydride (BPDA) and pyromellitic acid dianhydride (PMDA) as the tetracarboxylic acid components.

Since the base film is formed of the three components of PPD, BPDA and PMDA or the four components of PPD, DADE, BPDA and PMDA, it is not only excellent in heat resistance, tensile modulus, etc. but also the thermal expansion coefficient of the aromatic polyimide film obtained can be made substantially identical with that of a ferromagnetic material by variously controlling the ratios of the respective components employed for constituting both the components. Besides, the tensile modulus of the aromatic polyimide film can be varied so as to improve the stiffness, etc., of the film depending on its uses.

For formation of the base film to be used in the present invention, the diamine component, which may be, for example, a mixture of PPD and DADE, and the tetracarboxylic acid component which is a mixture of BPDA and PMDA are used in substantially equimolar amounts, copolymerized in an organic polar solvent at a relatively low temperature (about 80° C. or lower) to form an aromatic polyamic acid, the organic solvent solution (dope solution) of the aromatic polyamic acid is cast on the surface of a support to form a thin film of the dope solution, and the solvent is evaporated off under heating from the thin film to dry and solidify the film, followed further by imidation of the polyamic acid under a high temperature to form an aromatic polyimide film.

In the present invention, when an aromatic polyimide film obtained by film formation from a solution of an aromatic polyamic acid formed by copolymerization of the diamine component containing less PPD based on the total diamine component with the tetracarboxylic acid components, such a film may sometimes exhibit a large value of thermal, expansion coefficient, whereby it becomes very different from that of the magnetic layer comprising a ferromagnetic material. If a magnetic layer is formed on such a film at a considerably high temperature, undesirably extensive curl will be formed on the resultant magnetic recording medium. Also, such a film as mentioned above will have a relatively low secondary transition temperature of about 300° C. or lower, and the magnetic recording medium obtained around the secondary transition temperature may sometimes be undesirably subject to thermal deformation. For these reasons, the amount of PPD used should be 30 mole % or more, and the amount of DADE should be 0 to 70 mole %, respectively, based on the total aromatic diamine component.

In the present invention, when the ratio of PPD used is extremely high based on the total diamine component ot the diamine component consists substantially solely of PPD, the aromatic polyimide film formed from a solution of the aromatic polyamic acid by polymerization of such a diamine component and a tetracarboxylic acid component will have a lower elongation and poor physical properties such as impact resistance, etc.

Accordingly, in the present invention, in order to provide preferable thermal expansion coefficient, tensile modulus, and thermal properties, etc., for the magnetic recording medium, the diamine component used for formation of an aromatic polyamic acid should preferably comprise the two components of PPD in a proportion of about 40 to 95 mole %, particularly 45 to 90 mole %, and DADE in a proportion of about 5 to 60 mole %, particularly 10 to 55 mole %, respectively, based on the total diamine component.

It is preferred that the diamine component to be used for the formation of the aromatic polyimide film consists essentially of PPD and DADE, but another diamine, particularly an aromatic diamine may optionally be used as long as PPD and DADE are used within the respectively specified ranges and the essential properties of the aromatic polyimide film are retained.

On the other hand, in the present invention, for making various physical properties of the base film preferable for the magnetic recording medium, the tetracarboxylic acid component for formation of an aromatic polyamic acid should preferably comprise BPDA in a proportion of about 10 to 90 mole %, particularly 15 to 85 mole %, and PMDA in a proportion of about 10 to 90 mole %, particularly 15 to 85 mole %, respectively, based on the total tetracarboxylic acid component.

It is also preferred that the tetracarboxylic acid component to be used for the formation of the aromatic polyimide film consists essentially of BPDA and PMDA, but another tetracarboxylic acid, particularly an aromatic tetracarboxylic acid, may optionally be used as long as BPDA and PMDA are used within the respectively specified ranges and the essential properties of the aromatic polyimide film are retained.

In the present invention, the base film thus formed may have a thermal expansion coefficient within the range of from $1.0 \times 10^{-5}$ to $3.0 \times 10^{-5}$ cm/cm/°C., a tensile modulus within the range of from about 300 to 900 kg/mm$^2$, particularly from 325 to 700 kg/mm$^2$, and further a secondary transition temperature of about 300° C. or higher, particularly 310° C. or higher. Further, in addition to the properties as mentioned above, those having a thermal decomposition temperature of about 400° C. or higher, particularly 450° C. or higher, being capable of standing continuous use at a temperature around 250° C., and also having a tensile strength of about 20 kg/mm$^2$ or higher, particularly 25 kg/mm$^2$ or higher, and yet an elongation at break of about 30% or more, particularly 40% or more in tensile test, can exhibit excellent heat resistance during manufacturing of magnetic recording media to enable formation of magnetic layers at high temperature, in addition to prevention of generation of curl, and further can give optimally a magnetic recording medium free of winding irregularity and excellent in running performance and head touch.

A base film for a magnetic recording medium is required to have appropriate stiffness and pliability. While such stiffness and pliability, etc., depend primarily on the thickness and the tensile modulus of the base film, if a film having a small thickness and further a small modulus is used, it will generally result in poor running performance, occurrence of winding irregularity or deformation of the magnetic recording medium due to changes in environment. On the contrary, if a base film having a large thickness and further a large modulus is used, head touch will be worsened.

The base film of the aromatic polyimide film used in the magnetic recording medium of the present invention, which has an appropriate tensile modulus capable of harmonizing with various thicknesses, can be used as base films in various thicknesses. Particularly, since it can exhibit a sufficiently large tensile modulus (preferably about 400 kg/mm² or higher, particularly preferably about 450 to 800 kg/mm² or higher), the base film can be made considerably thin as about 50 microns or less, particularly 10 microns or less, and hence most suitable for magnetic tapes for long time recording. The lower limit of the thickness is not particularly limited, but the thickness may preferably be 3 microns or more, particularly 5 microns or more.

In the present invention, the ferromagnetic material forming the magnetic layer may be any type of ferromagnetic materials, provided that it can generally form a magnetic layer of the longitudinal magnetic recording system or the vertical magnetic recording system, as exemplified by ferromagnetic metals or alloys comprising Fe, Co, Ni as a main component such as Co, Co-Ni, Co-Ni-P, Co-Cr, Fe-Co, Fe-Cr, Co-V, Co-Rh, etc., or magnetic materials comprising oxides or nitrides such as Co-0, Fe-N, etc. Particularly, those alloys as mentioned above having a thermal expansion of the magnetic layer of about $0.5 \times 10^{-5}$ to $2.5 \times 10^{-5}$ cm/cm/°C., when formed into magnetic layers, may suitably be employed. In the present invention, the thickness of the magnetic layer is not different from that of the conventional vapor deposition type magnetic recording medium, and may generally fall within the range of from 0.1 to 1.0 $\mu$m.

Also, the magnetic layer as described above, instead of being formed directly on the base film, may also be provided through an intermediary nonmagnetic film such as that of Al, Ti, Cr, Ge, $SiO_2$, $Al_2O_3$, etc., or a high permeability film as represented by an Fe-Ni alloy film or amorphous films such as those of Co-Zr, Fe-P-C, Fe-Co-Si-B, etc. The high permeability film may preferably have a thickness on the order of 1 to 2 times that of the magnetic layer.

For formation of the magnetic layer on the aromatic polyimide film as described above, known vapor deposition methods such as the sputtering method, the electron beam continuous vapor deposition method, etc., may be employed, because the temperature of the aromatic polyimide film during formation of the magnetic layer on the surface of the film as mentioned above (vapor deposition temperature) can be elevated to about 250° C., whereby magnetic layers of excellent performance can readily be formed.

More specifically, the magnetic recording media known in the prior art are inferior in heat resistance of the base film so that magnetic layers having satisfactory performances have not been formed without difficulty or without restriction in conditions for preparation of the magnetic recording media. In contrast, the magnetic medium of the present invention, in which the base film has a normally available temperature up to about 250° C., is alleviated in limitations with respect to preparation conditions as mentioned above, and hence it is possible to prepare the medium at a sufficiently high temperature, whereby magnetic layers of excellent performances are formed.

The present invention is described more specifically by referring to the following Examples and Comparative Examples.

EXAMPLE 1

A cylindrical polymerization vessel with an inner volume of 300 ml was charged with 700 mm.moles of 3,3′,4,4′-biphenyltetracarboxylic acid dianhydride, 30 mm.moles of pyromellitic acid dianhydride, 60 mm.moles of p-phenylenediamine and 40 mm.moles of 4,4′-diaminodiphenylether, and further with 198.0 g of N-methyl-2-pyrrolidone. Polymerization reaction was carried out by stirring the mixture at a reaction temperature of 50° C. under normal pressure for 44 hours, to obtain a reaction mixture containing about 20.0% by weight of an aromatic polyamic acid with a high molecular weight.

The solution composition of the aromatic polyamic acid was cast on a smooth glass plate to form a liquid film of the solution composition having a uniform thickness, which liquid film was dried and solidified while elevating the temperature from about 60° to 200° C. Further, the solidified film was peeled off from the glass plate and subjected to heat treatment in a furnace by heating up to 350° C. to form an aromatic polyimide film with a thickness of 40$\mu$.

For this aromatic polyimide film, various physical properties were measured. As the result, the polyimide film exhibited a tensile strength of 31.4 kg/mm², an elongation of 52% and a tensile modulus of 487 kg/mm² in the tensile test, and also exhibited a linear expansion coefficient of $2.9 \times 10^{-5}$ cm/cm/°C. in measurement of thermal expansion coefficient, with the secondary transition temperature being 312° C.

By use of the above aromatic polyimide film as a base film and an alloy target comprising 80 wt. % Co and 20 wt. % Cr, according to the sputtering method in which the film formation speed of the magnetic layer was controlled at 0.2 $\mu$m/min. and the temperature of the base film was controlled at about 100° C. or 150° C., magnetic layers of the above magnetic material were formed to a width of about 0.5 $\mu$m, to prepare magnetic recording media for a vertical magnetic recording floppy disc, respectively. The Ar gas pressure during the film formation was 3 mm.Torr.

For those magnetic recording floppy discs, the state of curl was measured, and the extent of curl as represented in terms of the reciprocal of the radius of curvature of curl was about +0.02 (100° C.) or −0.07 (150° C.).

The value exhibiting the extent of curl (reciprocal of radius of curvature) indicates a plus value when curling occurs with the magnetic layer being on the inner side, while a minus value when it occurs with the magnetic layer being on the outer side.

EXAMPLES 2-7

Solution compositions of aromatic polyamic acids were prepared in the same manner as in Example 1 except for changing the proportions of the monomeric components for preparation of aromatic polyamic acids as shown in Table 1. Except for using the solution compositions thus obtained, base films of the aromatic polyimides were prepared in the same manner as in Example 1.

The physical properties of the films of the respective aromatic polyimide films were measured, and the results of the measurement are shown in Table 1.

Next, except for using the aromatic polyimide films prepared as described above, magnetic layers were formed on the aromatic polyimide films in the same manner as in Example 1, to prepare the floppy discs according to the present invention.

The states of curls of those floppy discs are also shown in Table 1.

EXAMPLES 8–13

By use of the respective aromatic polyimide films prepared in the same manner as in Examples 1–7 (excluding Example 4) as base films, and also by use of alloys of Ni-Fe and Co-Cr in formation of magnetic layers by sputtering, the film layer comprising Ni-Fe was first formed at a vapor deposition temperature of 20° C. to a thickness of 0.5 μm and then the film layer comprising Co-Cr formed at a vapor deposition temperature of 150° C. to a thickness of 0.3 μm, thus forming a double-layered magnetic layer, following otherwise the same procedure as in Examples, magnetic recording sheets were prepared. The states of curl of those magnetic recording sheets are also shown in Table 1.

TABLE 1

| Example | Diamine component (m. mole) PPD | DADE | Tetracarboxylic acid component (m. mole) BPDA | PMDA | Thermal expansion coefficient ×10⁻⁵ (cm/cm/°C.) | Modulus (kg/mm²) | Extent of curl (1/radius of curvature) 100° C. | 150° C. |
|---|---|---|---|---|---|---|---|---|
| 1 | 60 | 40 | 70 | 30 | 2.9 | 487 | +0.02 | −0.07 |
| 2 | 90 | 10 | 90 | 10 | 2.0 | 722 | +0.12 | +0.11 |
| 3 | 80 | 20 | 70 | 30 | 2.1 | 591 | +0.13 | +0.11 |
| 4 | 70 | 30 | 50 | 50 | 1.9 | 507 | +0.14 | +0.12 |
| 5 | 70 | 30 | 30 | 70 | 2.4 | 469 | +0.09 | +0.04 |
| 6 | 70 | 30 | 20 | 80 | 1.6 | 483 | +0.22 | +0.15 |
| 7 | 50 | 50 | 40 | 60 | 2.6 | 396 | +0.04 | +0.00 |
| 8 | 60 | 40 | 70 | 30 | 2.9 | 487 | — | −0.22 |
| 9 | 90 | 10 | 90 | 10 | 2.0 | 722 | — | +0.00 |
| 10 | 80 | 20 | 70 | 30 | 2.1 | 591 | — | +0.00 |
| 11 | 70 | 30 | 30 | 70 | 2.4 | 469 | — | −0.08 |
| 12 | 70 | 30 | 20 | 80 | 1.6 | 483 | — | +0.10 |
| 13 | 50 | 50 | 40 | 60 | 2.6 | 396 | — | −0.12 |

EXAMPLES 14–17

The solutions of the aromatic polyamic acids obtained in Examples 3, 4, 5 and 7 as described above were cast on smooth glass plates to form liquid films of the solution compositions having uniform thicknesses, which liquid films were dried and solidified while elevating the temperature from about 60° to 200° C. Further, the solidified films were peeled off from the glass plates, subjected to heat treatment in a furnace by heating up to 350° C. to form aromatic polyimide films in a thickness of 10μ. The results of measurement of the physical properties of the respective aromatic polyimide films were found to be substantially the same as those of Examples 3, 4, 5 and 7.

By use of each aromatic polyimide film as the base film, according to the electron beam heating vapor deposition method in which the film formation speed of the magneitc layer was made 0.1 μm/sec. and the temperature of the aromatic polyimide film was controlled to about 250° C., a magnetic layer of 79 wt. % Co - 21 wt. % Cr was formed continuously on the aromatic polyimide film to prepare a magnetic recording tape.

The results of measurement of the curled states of these magnetic recording tapes are shown in Table 2.

TABLE 2

| Example | Diamine component (m. mole) PPD | DADE | Tetracarboxylic acid component (m. mole) BPDA | PMDA | Extent of curl 1/R |
|---|---|---|---|---|---|
| 14 | 80 | 20 | 70 | 30 | −0.12 |
| 15 | 70 | 30 | 50 | 50 | ∼0.0 |
| 16 | 70 | 30 | 30 | 70 | −0.53 |
| 17 | 50 | 50 | 40 | 60 | −1.2 |

EXAMPLES 18–20, COMPARATIVE EXAMPLES 1 AND 2

From the monomers with component ratios as shown in Table 3, solution compositions of aromatic polyamic acids were prepared, and aromatic polyimide films with a thickness of 6 μm were formed therefrom. On the aromatic polyimide films were formed magnetic layers of 80 wt. % Co - 20 wt. % Ni to a thickness of 0.15 μm according to the oblique vapor deposition method by means of an electron beam heating continuous vapor deposition device, followed further by formation of lubricating layers on the Co-Ni magnetic layers, to form magnetic tapes, respectively (Examples 18–20). The formation speed of Co-Ni magnetic layers was 0.2 μm/sec. and the temperature of the can was −5° C.

On the other hand, on polyethyleneterephthalate (PET) films in thicknesses of 6 μm and 11.5 μm, Co-Ni magnetic layers in a thickness of 0.15 μm and lubricating layers were formed in the same manner as in Examples 18–20 to prepare a magnetic tape of Comparative Example 1 (one employing PET in a thickness of 6 μm) and a magnetic tape of Comparative Example 2 (one employing PET in a thickness of 11.5 μm).

For all of the magnetic tapes as described above, recording reproduction and running tests were performed by use of an 8 mm video deck. As a result, in the magnetic tape of Comparative Example 1, small projections were generated on the surface due to thermal damage of the base film and generation of oligomers, whereby drop-out occurred very frequently.

In contrast, in the magnetic tapes of Examples 18–20, there was found substantially no generation of small projection on the surface.

On the other hand, the magnetic tape of Comparative Example 1, due to small modulus of the base, the magnetic tape is lacking stiffness to give rise to lowering in reproduction output on account of running irregularity and poor head touch. When it is desired to prepare a magnetic tape without running irregularity and with good head touch, the thickness of the magnetic type is required to be at least that of the magnetic tape of Comparative Example 2.

In contrast, the magnetic tapes of Example 18 and Example 19 exhibited output images and running performances similar to those of the magnetic tape of Comparative Example 2 even with the use of a base film with a thickness of 6 μm (the moduli of the base films used in Examples 18 and 19 were 809 kg/mm² and 653 kg/mm², respectively). Accordingly, when the tapes of Example 18, Example 19 and Comparative Example 2 were used in cassettes, the recording time for the magnetic tapes of Example 18 and Example 19 could be about two-times that for the magnetic tape of Comparative Example 2.

TABLE 3

|  | Diamine component (m. mole) | | Tetracarboxylic acid component (m. mole) | |
| --- | --- | --- | --- | --- |
|  | PPD | DADE | BPDA | PMDA |
| Example 18 | 100 | 0 | 80 | 20 |
| 19 | 90 | 10 | 70 | 30 |
| 20 | 70 | 30 | 20 | 80 |
| Comparative 1 | | 6 μm PET film | | |
| Example 2 | | 11.5 μm PET film | | |

EXAMPLES 21-25

Example 1 was repeated, except for changing the ratios of the monomers used for preparation of aromatic polyamic acids as shown in Table 4, to prepare solution compositions of aromatic polyamic acids. By use of the solution compositions thus prepared, base films of aromatic polyimide films were prepared. All of the base films had a thickness of 10 μm. On these base films, Co was laminated as the magnetic layer according to the oblique vapor deposition method by means of an electron beam heating continuous vapor deposition device. All of the magnetic layers had a thickness of 0.12 μm and the temperature of the can was 250° C. The deposition speed of the magnetic layer was about 0.1 μm/sec.

The curled states of the magnetic tapes of the present invention thus prepared are shown in Table 4.

TABLE 4

| Example | Diamine component (m. mole) | | Tetracarboxylic acid component (m. mole) | | Termal expansion coefficient $\times 10^{-5}$ (cm/cm/°C.) | Extent of curl (1/radius of curvature) |
| --- | --- | --- | --- | --- | --- | --- |
|  | PPD | DADE | BPDA | PMDA | | |
| 21 | 70 | 30 | 60 | 40 | 2.6 | −0.53 |
| 22 | " | " | 50 | 50 | 1.9 | 0.02 |
| 23 | " | " | 40 | 60 | 1.9 | 0.01 |
| 24 | " | " | 30 | 70 | 2.4 | −0.22 |
| 25 | " | " | 20 | 80 | 1.6 | 0.13 |

As is apparent from the above examples, in the magnetic recording medium of the present invention, the occurrence of curl can be minimized by adjusting a thermal expansion coefficient of the base film through adjustment of the proportions of the components thereof to the thermal expansion coefficient of the magnetic layer deposited thereon. Further, the magnetic recording medium according to the present invention, as shown in the above examples, was found to have a tensile modulus of elasticity within the optimum range of 300–900 kg/mm² and to be also excellent in respect to stiffness and pliability.

What is claimed is:

1. A magnetic recording medium comprising an aromatic polyimide film and a magnetic layer of a ferromagnetic metal provided on said aromatic polyamide film; said aromatic polyimide film being prepared by imidation of a film formed from a solution of an aromatic polyamic acid which has been obtained by copolymerization of aromatic diamine components comprising 40–95 mole % of a p-phenylenediamine and 5–60 mole % of diaminodiphenyl ether, respectively based on the total amount of the aromatic diamine components, and tetracarboxylic acid components comprising 15-85 mole % of biphenyltetracarboxylic acid dianhydride and 15-85 mole % of pyromellitic acid dianhydride.

2. A magnetic recording medium according to claim 1, wherein said magnetic layer is a Co layer formed by oblique vapor deposition.

3. A magnetic recording medium according to claim 1, wherein said aromatic diamine component comprises 45 to 90 mole % of p-phenylenediamine and 10 to 55 mole % of diaminodiphenylether.

4. A magnetic recording medium according to claim 1, wherein said magnetic layer comprises a Co-Cr alloy.

5. A magnetic recording medium according to claim 4, wherein said magnetic layer of a Co-Cr alloy is formed on said aromatic polyimide film through a Fe-Ni alloy layer.

6. A magnetic recording medium according to claim 1, wherein said aromatic polyimide film layer has a thickness of 50μ or less.

7. A magnetic recording medium according to claim 6, wherein said aromatic polyimide film layer has a thickness of 10μ or less.

8. A magnetic recording medium according to claim 1, wherein said magnetic layer has a thickness of 0.1 to 1.0μ.

9. A magnetic recording medium according to claim 1, wherein said magnetic layer is provided directly on said aromatic polyimide film layer.

10. A magnetic recording medium according to claim 1, wherein said magnetic layer is provided through an intermediary non-magnetic film on said aromatic polyimide film layer.

11. A magnetic recording medium according to claim 10, wherein said non-magnetic film is either one of Al, Ti, Cr, Ge, SiO₂ and Al₂O₃.

12. A magnetic recording medium according to claim 1, wherein said magnetic layer is provided through an intermediary film with high permeability.

13. A magnetic recording medium according to claim 12, wherein said intermediary film is a Fe-Ni alloy film.

14. A magnetic recording medium according to claim 12, wherein said intermediary film is an amorphous film of the group consisting of Co-Zr, Fe-P-C and Fe-Co-Si-B.

15. A magnetic recording medium according to claim 1, wherein said magnetic layer is a Co-Ni alloy layer formed by oblique vapor deposition.

* * * * *

UNITED STATES PATENT AND TRADEMARK OFFICE
CERTIFICATE OF CORRECTION

PATENT NO. : 4,673,612
DATED : June 16, 1987
INVENTOR(S) : HIROSHI TAKAGI, ET AL.

It is certified that error appears in the above-identified patent and that said Letters Patent is hereby corrected as shown below:

AT [57] UNDER THE REFERENCES - U.S. PATENT DOCUMENTS

Line 4, "4,565,234" should read --4,565,734--.

COLUMN 2

Line 34, "tensil" should read --tensile--.
    Line 41, "xedia" should read --media--.

COLUMN 3

Line 48, "thermal, expansion" should read --thermal expansion--.
    Line 65, "ot" should read --or--.

COLUMN 9

Line 67, "polyamide" should read --polyimide--.

Signed and Sealed this

Seventeenth Day of November, 1987

Attest:

DONALD J. QUIGG

Attesting Officer      Commissioner of Patents and Trademarks